(12) United States Patent
Umana

(10) Patent No.: US 11,759,045 B2
(45) Date of Patent: Sep. 19, 2023

(54) PORTABLE NEGATIVE PRESSURE EXTRACTION COFFEE MACHINE

(71) Applicant: Eduardo Gomez Umana, Miami, FL (US)

(72) Inventor: Eduardo Gomez Umana, Miami, FL (US)

(*) Notice: Subject to any disclaimer, the term of this patent is extended or adjusted under 35 U.S.C. 154(b) by 344 days.

(21) Appl. No.: 16/939,541

(22) Filed: Jul. 27, 2020

(65) Prior Publication Data
US 2020/0359826 A1    Nov. 19, 2020

Related U.S. Application Data

(63) Continuation-in-part of application No. PCT/IB2018/050600, filed on Jan. 31, 2018.

(51) Int. Cl.
| A47J 31/32 | (2006.01) |
| A47J 31/02 | (2006.01) |
| A47J 31/00 | (2006.01) |
| A47J 31/06 | (2006.01) |
| A47J 31/36 | (2006.01) |

(52) U.S. Cl.
CPC ............. *A47J 31/02* (2013.01); *A47J 31/005* (2013.01); *A47J 31/0626* (2013.01); *A47J 31/32* (2013.01); *A47J 31/36* (2013.01)

(58) Field of Classification Search
CPC ...... A47J 31/005; A47J 31/0626; A47J 31/24; A47J 31/32; A47J 31/36; A47J 31/02; A47J 31/10

USPC .......................................................... 99/323.1
See application file for complete search history.

(56) References Cited

U.S. PATENT DOCUMENTS

2019/0191913 A1 *   6/2019  Richardson ........... A47J 31/005

FOREIGN PATENT DOCUMENTS

EP              0900541 A1 *   3/1999   .......... A47J 31/0626

* cited by examiner

*Primary Examiner* — Reginald Alexander

(57) ABSTRACT

A portable, battery-operated vacuum infusion machine includes a top container assembly with a compartment that houses an air pump, a battery, and a controller. The top container assembly couples to the top opening of a separate bottom container. When coupled together, the top and bottom containers are connected by flow holes superimposed by a filter in the top container. An air pump switched on or off by a controller exerts negative pressure in the bottom container by means of a suction port and induces liquid in the top container to enter the bottom container under pressure while the filter in the top container ensures that the infusion residue is separated from the liquid and only the prepared infusion has passage to the bottom container. The bottom container can be opened by means of removing the top container in order to allow for serving the prepared infusion.

15 Claims, 8 Drawing Sheets

US 11,759,045 B2

PORTABLE NEGATIVE PRESSURE EXTRACTION COFFEE MACHINE

BACKGROUND OF THE INVENTION

The invention relates generally to beverage makers and more specifically to a portable infusion maker that forces the filtering of an infusion with negative pressure exerted by a battery operated vacuum pump with the objective of improving the sensory characteristics of coffee or tea and providing a preparation process that is portable, fast, easy, and in a small form-factor machine.

SUMMARY OF THE INVENTION

The invention relates to a portable negative-pressure infusion machine for use in the preparation of coffee, tea and in general beverages prepared by infusion. More specifically, an embodiment of a portable, battery-operated negative pressure infusion machine that consists of two containers: an open top container and a bottom closed container which can be opened by removing the top container. The top and bottom containers are connected by one or more flow holes superimposed by a filter in the top container. An air pump switched on or off by a controller exerts negative pressure in the bottom container by means of a suction port and induces hot or cold liquid in the top container to enter the bottom container under pressure while the filter in the top container ensures that the infusion residue is separated from the liquid and only the prepared infusion has passage to the bottom container. The bottom container can be opened by means of removing the top container in order to allow for serving the prepared infusion.

In an embodiment of the invention the controller may be connected to an actuator such as a mechanical or capacitive button that allows for switching of the air pump. In an alternative embodiment of the invention a controller capable of wireless interfacing allows for switching of the air pump by command of an external device capable of wireless communication such as a smartphone, tablet, computer, smartwatch, or similar.

In an embodiment of the invention, the battery is rechargeable and can be connected mechanically or wirelessly to an external power supply. The connection between the battery and an external power supply may be mechanical in the form of a cable, or wireless in the form of inductive coupling with an inductive charging pad. In other embodiments of the invention the battery may be user replaceable. In this embodiment the used battery can be removed from the machine and a new battery can be installed in its place.

DESCRIPTION OF THE DRAWINGS

To further clarify the invention and its advantages compared to prior art, the possible forms of illustrative and non-limiting embodiments of the application of said principles are described below with the help of the attached drawings.

DESCRIPTION OF SPECIFIC EMBODIMENTS

Figure 4:
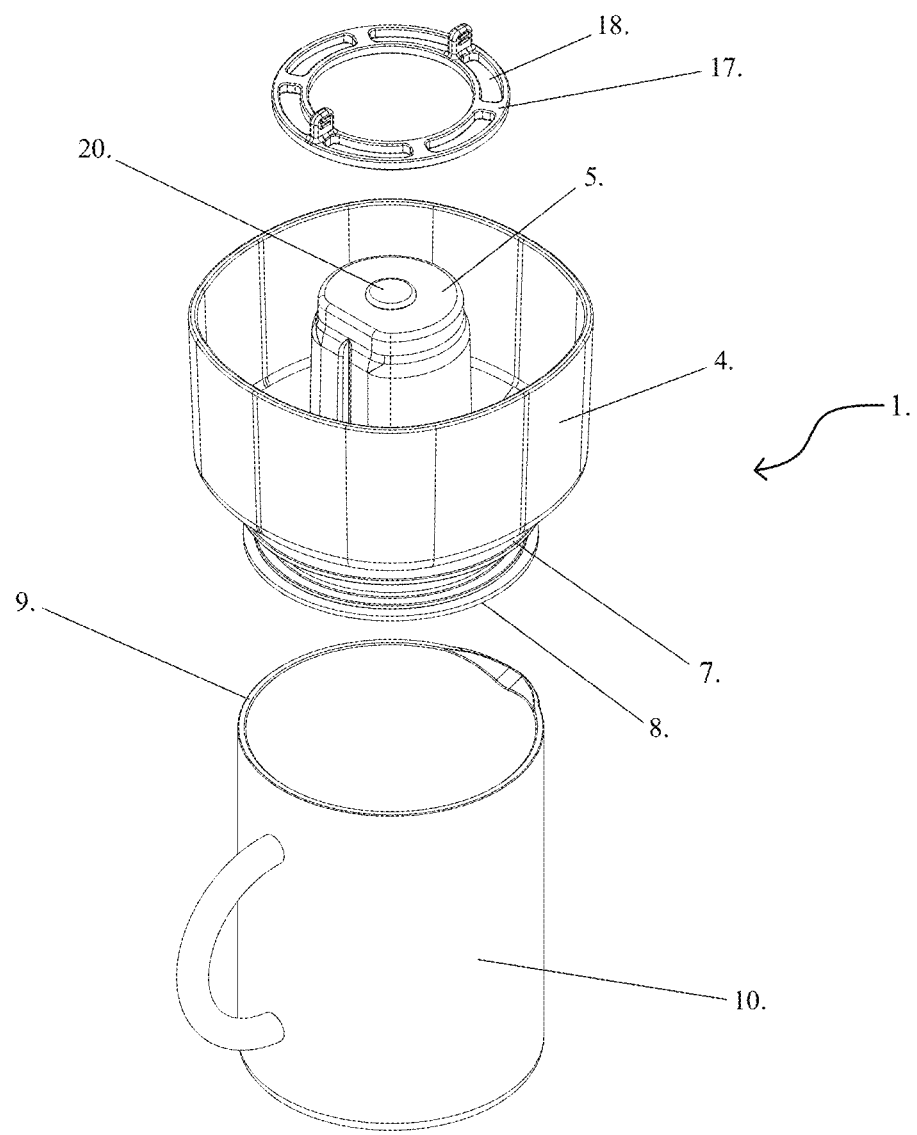
FIG. 4 shows an exploded view of the portable negative pressure infusion machine according to the invention.
Figure 5:
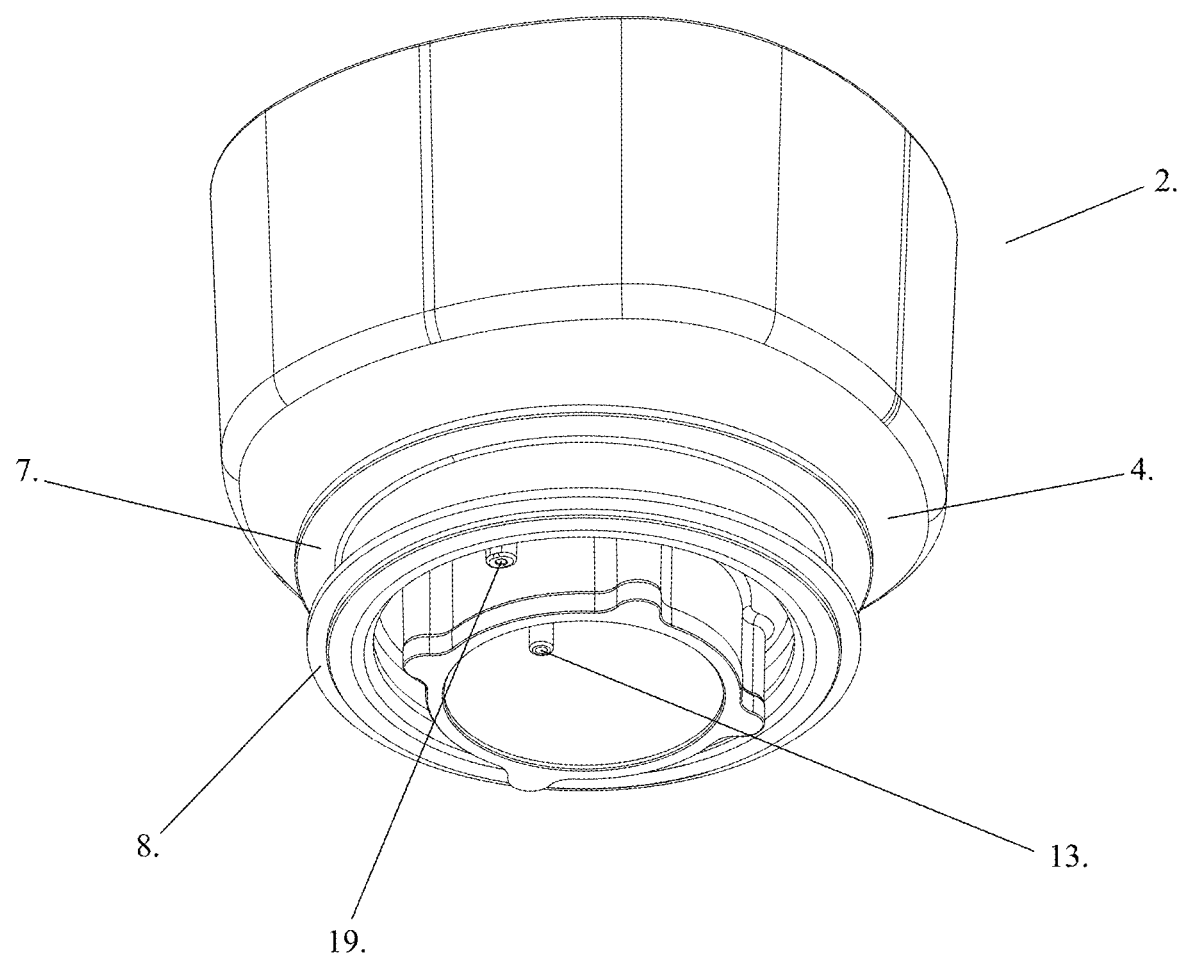
FIG. 5 illustrates the top container assembly removed from bottom container of the portable negative pressure infusion machine according to the invention, and rotated 180° from view shown in FIG. 2.
Figure 6:
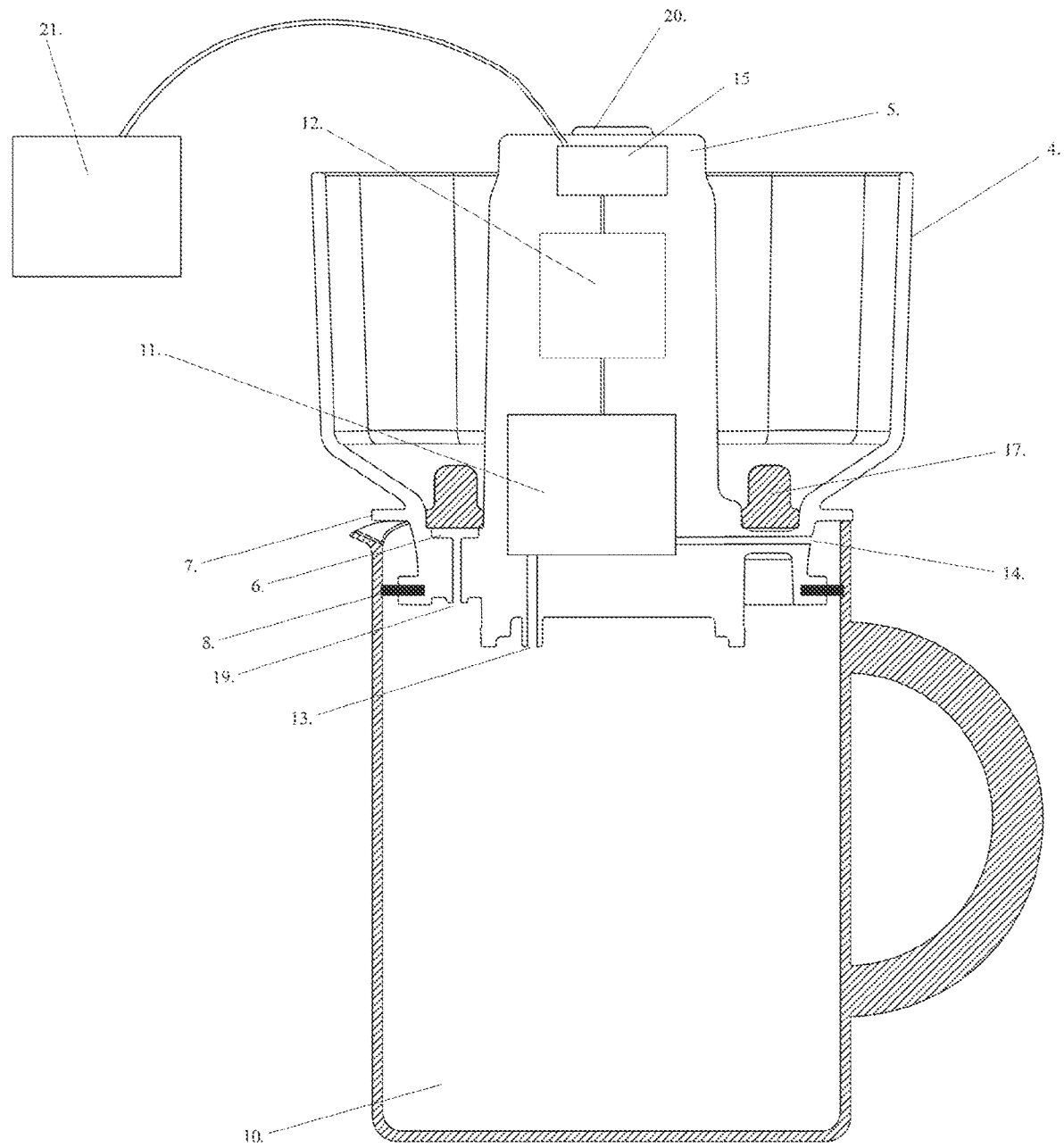
FIG. 6 illustrates the side section of the portable negative pressure infusion machine according to the invention.

FIG. 4 illustrates an infusion machine according to a specific embodiment of the invention. The machine assembly 1 comprises of top container 2 that is configured to receive a mixture of liquid and solid to be infused. Said top container 2 comprises side walls 4 and an inner compartment 5 arranged concentrically to walls 4 and that houses controller 15, battery 12, and air pump 11. Compartment 5 is separated from walls 4 forming a channel space 6 that is arranged between the central container 5 and walls 4 of top container 2. Said channel 6 receives a removable filter 17 that includes windows of filtering material 18 to filter the solid from the liquid mixture in top container 2. Said filter completely covers channel 6 and is arranged above flow hole 19.

Additionally, said top container 2 comprises a coupling neck 7 and seal 8 that interface with top opening 9 of bottom container 10. When top container 2 is coupled with bottom container 10, seal 8 creates a hermetic atmosphere inside bottom container 10.

To create a vacuum inside closed container 10 with the purpose of infusing a mixture of liquid and solid placed onto filter 17 arranged into channel space 6 of top container 2, said compartment 5 in top container 2 houses an air pump 11 that produces negative pressure in the bottom container through suction port 13. The air pump moves air inside the sealed bottom container 10 to the outside of bottom container 10 and exhausts the air through port 14, thus, creating a vacuum in bottom container 10 and forcing the infused liquid in top container 2 to filter through filter 17 and enter bottom container 10 at a pressure through flow hole 19. Air pump 11 is powered by battery 12 and in turn the circuit is switched on or off by controller 15. Controller 15 can be actuated mechanically through button 20 or wirelessly through an external device capable of wirelessly interfacing with controller 15.

Thus, the vacuum infusion machine 1 consists of a removable top container 2 and a bottom container 10, connected by a flow hole 19 superimposed by filter 17 and where a suction air pump 11 exerts a vacuum in the closed container 10 by means of a suction hole 13 and induces the liquid in the top container 2 to enter with pressure into bottom container 10 through said flow hole 19, while the filter 17 guarantees that the residue of the infusion remains in top container 2 and there is only passage to the prepared infusion to the bottom container 10. Finally, the top container 2 and the bottom container 10 can be decoupled in order to allow for serving the prepared infusion inside bottom container 10 after the infusion cycle finishes.

Figure 7:
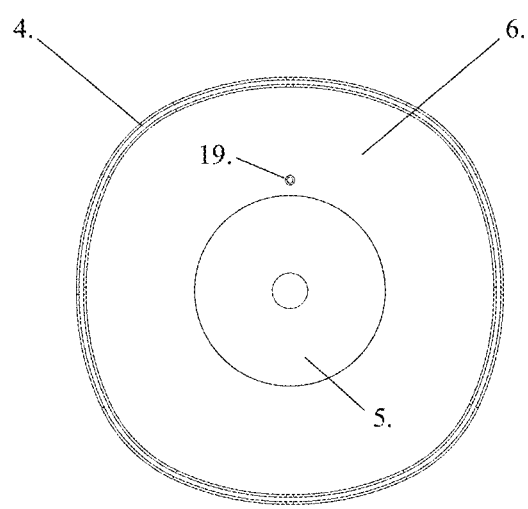
FIG. 7 illustrates the preferred embodiment of the invention wherein the compartment housing the air pump, battery, and controller is positioned concentrically to the walls of the top container assembly.
Figure 8:
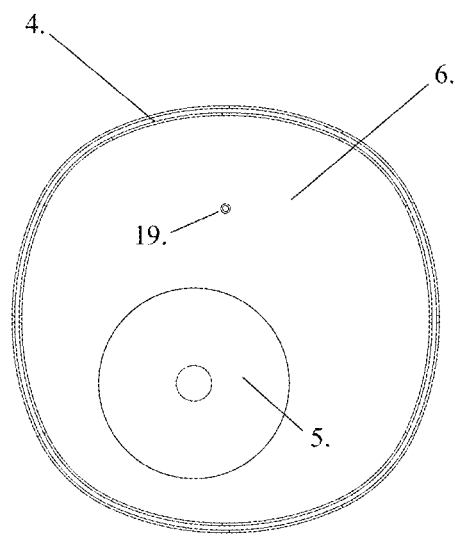
FIG. 8 illustrates an alternative embodiment of the invention wherein the compartment housing the air pump, battery, and controller is positioned eccentrically to the walls of the top container assembly.
Figure 9:
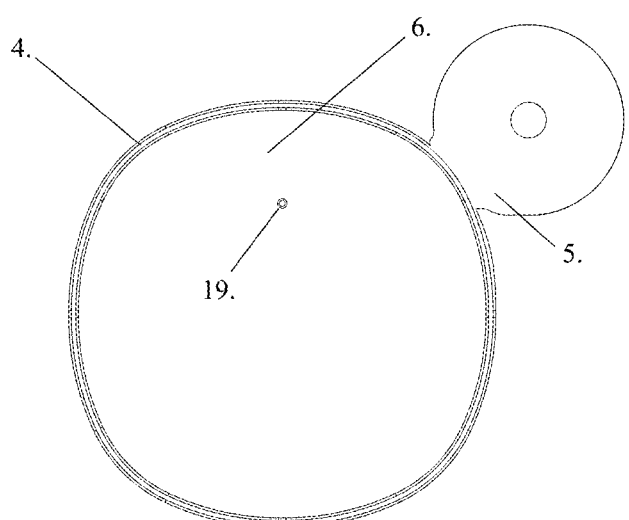
FIG. 9 illustrates an alternative embodiment of the invention wherein the compartment housing the air pump, battery, and controller is positioned outside of the walls of the top container assembly.
Figure 10:
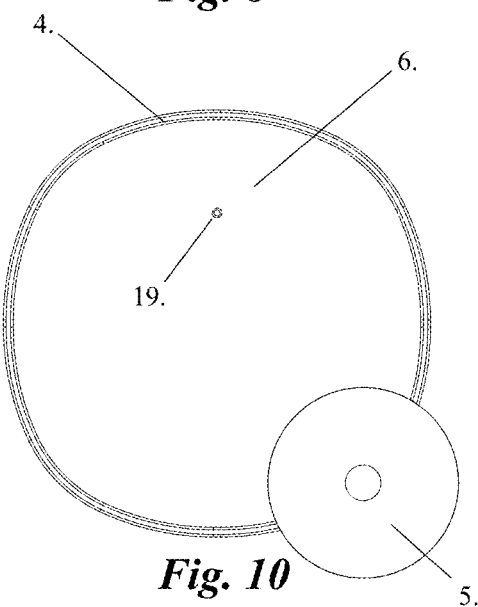
FIG. 10 illustrates an alternative embodiment of the invention wherein the compartment housing the air pump, battery, and controller is positioned between the walls of the top container assembly.
Figure 11:
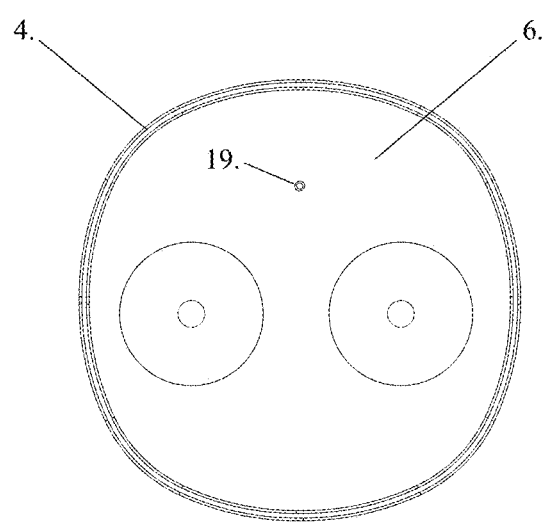
FIG. 11 illustrates an example of an alternative embodiment of the invention wherein the top container comprises of several compartments that could house any combination of the air pump, battery, and controller inside the walls of the top container assembly.
Figure 12:
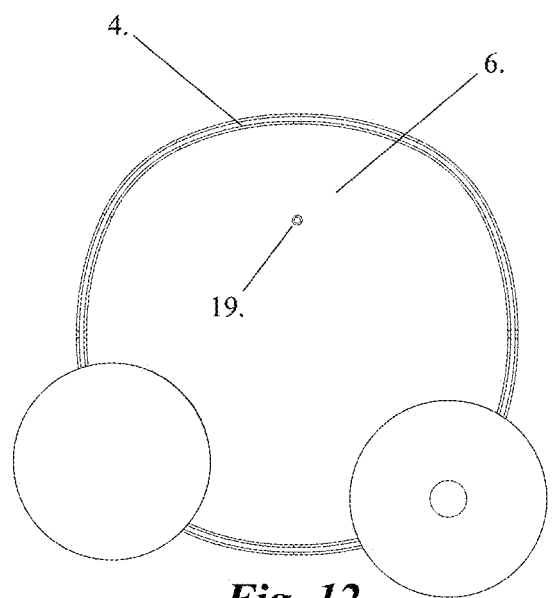
FIG. 12 illustrates an example of an alternative embodiment of the invention wherein the top container comprises of several compartments that could house any combination of the air pump, battery, and controller between the walls of the top container assembly.
Figure 13:
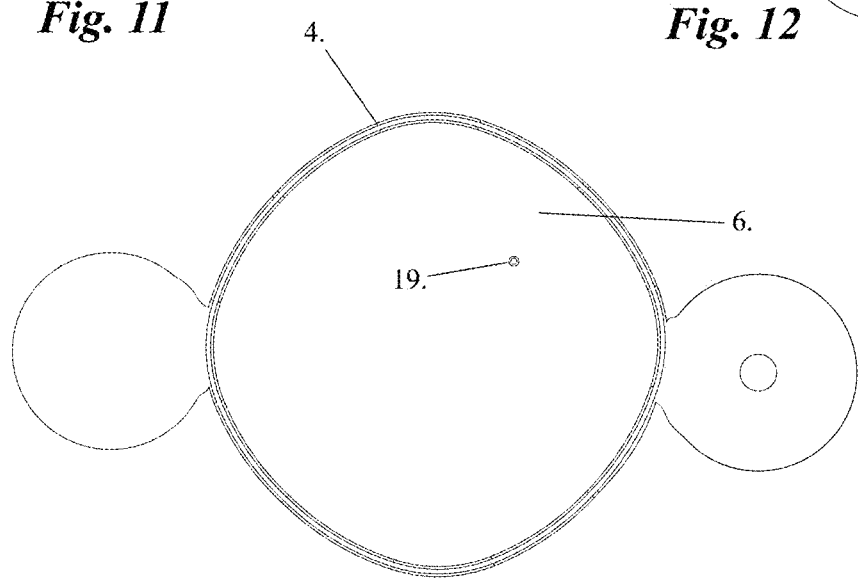
FIG. 13 illustrates an example of an alternative embodiment of the invention wherein the top container comprises of several compartments that could house any combination of the air pump, battery, and controller outside the walls of the top container assembly.

In the preferred embodiment of the invention, compartment 5 is arranged concentrically to walls 4 to preserve the center of gravity of infusion machine 1 along the center axis of the assembly as shown in FIG. 7. In alternative embodiments of the invention, one or more compartments housing one or more, in any combination, of air pump 11, battery 12, and controller 15 may be arranged inside top container assembly 2 but eccentrically to walls 4 or these one or more compartments may be arranged outside or between walls 4 in a variety of arrangements as shown, but not limited to FIGS. 8, 9, 10, 11, 12, and 13.

In preferred embodiments of the invention, compartment 5 is sealed to the environment and may comprise of an access cover to the interior of compartment 5 to allow for connecting battery 12 to an external power source with the purpose of recharging battery 12. In other embodiments said access cover provides access to replace battery 12 by a new battery. In alternative embodiments of the invention where the battery is rechargeable, the battery may be wirelessly charged inductively in which an access cover is not necessary.

In alternative embodiments, flow port 19 can vary in quantity, size, shape, and direction. For example, if each flow hole has a direction of 70° in relation to the base plane of the channel 6 of top container 2, where the coffee would enter into the bottom container at an angle generating a whirlpool.

In conclusion, the coffee machine according to the invention is self-sufficient without the need to be connected or anchored for an infusion cycle. It is light and easy to carry. Only some preferred embodiments of the invention have been illustrated by way of example and figures. In this regard, it will be appreciated that the construction of the portable negative pressure infusion machine, as well as the configurable arrangements that can be chosen from the plurality of alternatives without departing from the spirit of the invention according to the claims, be considered within the scope of the invention.

OBJECT OF THE INVENTION

A subject of the invention is a negative pressure extraction portable coffee machine assembly. More precisely but not exclusively, it discloses a portable negative pressure extraction coffee machine assembly that is related to coffee preparation machines that includes, without limitation, filtering, infusion and/or brewing of coffee or the like, filtered by negative pressure and by battery-based actuation.

The invention relates to a negative pressure extraction portable coffee machine assembly for use in the preparation of coffee, tea and in general beverages prepared by infusion.

In particular, it refers to a machine consisting of two chambers: one open and one closed, connected by a flow hole superimposed by a filter where a suction air pump exerts a vacuum by negative pressure in the closed chamber by means of a suction port and induces liquid in the open chamber to enter the closed chamber under pressure through the flow port, while the filter ensures that the infusion residue remains in the open chamber and there is only passage to the closed chamber of the prepared infusion. The negative pressure extraction portable coffee machine assembly is for the preparation of coffee, tea and in general beverages prepared by infusion.

In the invention, the term infusion is naturally to be understood in the broad sense, to designate any infusion, tea, coffee or other beverage preparation of the same type.

Therefore the object of this document is to provide an improved assembly of a portable negative pressure extraction coffee machine.

The aim of the invention is therefore to alleviate the drawbacks of the prior art by making a machine of a very simplified design, of the portable type, and which provides great comfort and safety of use.

This objective is achieved thanks to the fact that the apparatus essentially consists of a portable structure that is based on improving the infusion of beverages, so that by forcing the filtering, the sensory and organoleptic characteristics of coffee are improved, additionally providing a preparation process of coffee that is quick, easy, and effective.

The invention meets these needs and provides other related advantages.

The invention relates to a portable coffee machine assembly related to negative pressure beverage preparation machines. The field of the invention is related to the industry for preparing coffee and hot drinks. This field is aimed at both commercial locations and private use and the portable preparation of hot drinks at home.

A subject of the invention is a portable negative pressure extraction coffee machine assembly. More precisely but not exclusively, it discloses a portable negative pressure extraction coffee machine assembly that is related to coffee preparation machines that includes, without limitation, filtering, infusion and/or brewing of coffee or the like, filtered by negative pressure.

As is known, existing apparatus of this type, for example as described in PCT application WO/2005/011394 by Cai, Edward Z et al, a device and method for preparing coffee comprises a body connected to a container to allow the formation of a dispersion of flavor-containing materials and liquids, where the sealing mechanism has a gripping chamber in the body to form a vacuum when pushed into the container and then released to suck up to the interior surface of the container. The infusion device allows to prepare hot coffee, coffee with milk, mocha and other beverages directly into a thermos. The infusion device comprises a thermos adapted to receive a supply of roasted coffee grounds and a liquid and to allow the formation of a dispersion therein to facilitate the removal of the coffee grounds. The thermos comprises a thermoelectric chamber that has an inner wall, an outer wall, and a thermal insulation layer such as a gas or vacuum layer sandwiched between the inner and outer walls, and a housing that has a beverage outlet, a handle, and a threaded inlet. A device preparation head assembly has a threaded body to connect the threaded inlet of the thermos. The thermoelectric chamber is mounted between an upper gasket under the upper wall of the housing.

Likewise, U.S. Pat. No. 8,166,868 by Skalski, Lukasz D., et al discloses apparatus, methods and systems for liquid flow control and beverage preparation. According to this state of the art, the apparatus, methods and systems include capsules, sachets, cartridges and modules that include liquid flow control and beverage preparation to direct liquid flow streams through a beverage preparation process to the intermediate of said capsules. The pressure and force acting to dispense the component could be derived from a negative pressure resulting from the passage of liquid through or into the liquid flow path, such as when a vacuum or the Venturi effect is used to extract the component into the path of fluid flow or where the positive pressure of the liquid head acts on a bladder containing the component.

These appliances with insert pieces, capsules, mobile closure systems require experience for use and some experience in accommodation of the coffee supply. On the other hand, with such devices, the user can hardly consider making an infusion outside of his home, for example in his vehicle, due, not only to the volume and weight of the device, but also to its connection to the electrical network to supply the pumping medium to prepare the infusion.

However, to alleviate these drawbacks, apparatus for vehicles have been made as described for example in the European patent EP1978853 by Nielsen, Henrik, et al, which defines a machine for making an infusion from a load of product to be infused, such as coffee or tea powder or capsule, and comprising a water tank, a housing having a chamber having a nozzle for supplying hot water and an opening through which a charge of product can be introduced into infusing, means connected to the reservoir for delivery during a brewing cycle, a certain volume of water brought to an infusion temperature from said reservoir to said chamber and an infusion flow port.

These devices remain, despite their adapted dimensions, classic design with practically the same bulky and expensive internal components.

Furthermore, in the case where you want to prepare and offer a coffee infusion, for example, in a room dedicated to meetings, the known appliances are hardly manageable, they are still heavy, bulky and noisy.

Therefore, there is a need for a lightweight, portable, economical, effective and easy to manufacture solution, with the least amount of material use and with the best way to prepare coffee.

The invention relates to a negative pressure extraction portable coffee machine assembly for use in the preparation of coffee, tea and in general beverages prepared by infusion.

Specifically, the invention defines a machine for preparing an infusion from a load of product to be infused, such as coffee or tea powder or ground or in doses, and comprising a water tank in a chamber that ends in a water outlet throat that includes a filter passage capable of receiving a load of product to be infused, and a negative pressure extraction mean that delivers the product obtained during an infusion cycle towards a tank or jug.

The infusion cycle thus, according to the apparatus assembly of the invention, comprises a certain volume of water, brought to an infusion temperature, from said chamber to said tank by means of an infusion flow filter.

The invention relates to a negative pressure extraction portable coffee machine assembly for use in the preparation of coffee, tea and in general beverages prepared by infusion.

Figure 1:
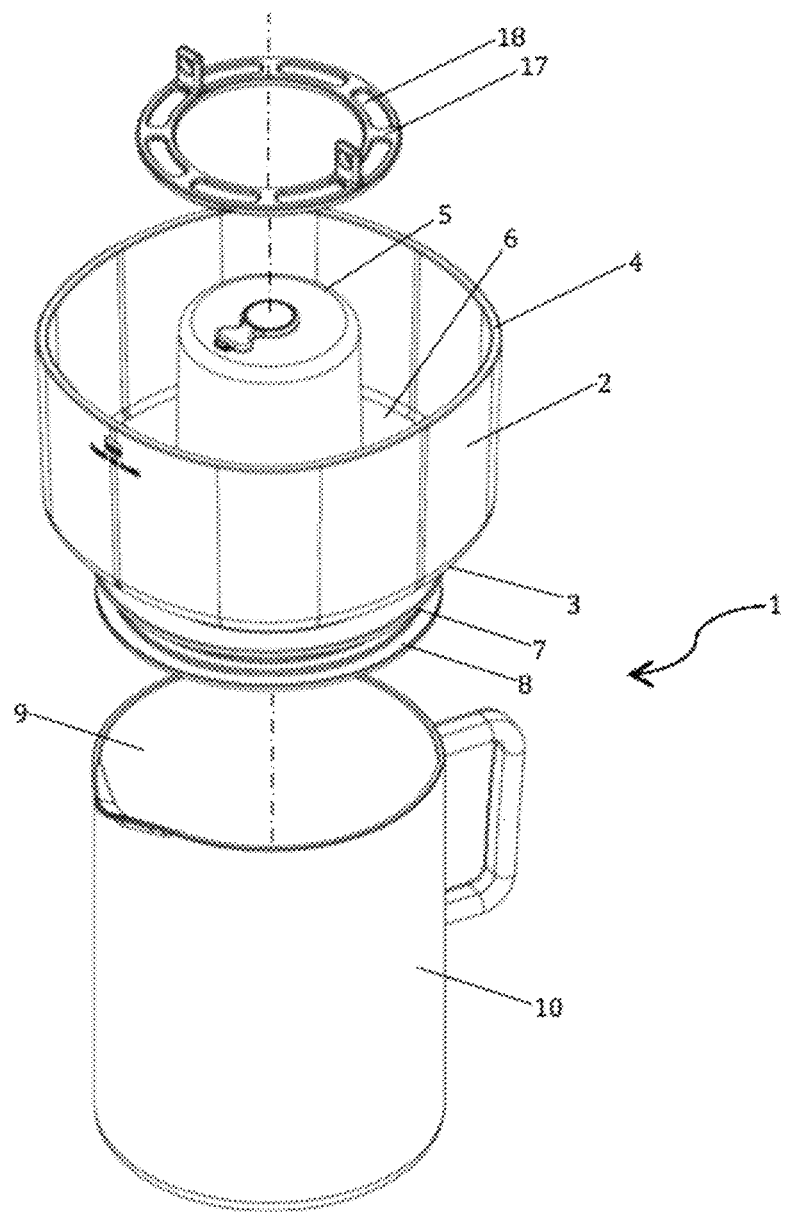
FIG. 1 illustrates an exploded view of the negative pressure extraction portable coffee machine assembly according to the invention.

Particularly in relation to FIG. 1, the invention defines a machine assembly intended to prepare an infusion from a load of product to be infused, such as coffee or tea powder or ground or in doses.

According to the invention, the machine consists of two chambers: one open and one closed, connected by a flow hole superimposed by a filter where a suction air pump exerts a vacuum by negative pressure in the closed chamber by means of a suction hole and induces liquid in the open chamber to enter the closed chamber under pressure through a flow port, while the filter ensures that the infusion residue remains in the open chamber and there is only passage of the prepared infusion to the closed chamber.

The chambers are connected interspersed one inside the other where a gasket seals the closed chamber and prevents the exit or entry of air from it. In preferred embodiments of the invention, the chambers can be separated to open the closed chamber and serve the prepared infusion.

Similarly, the invention provides a control circuit that turns the air pump on and off. There is also a port to connect the battery that is inside the machine to an external current source that allows it to be recharged.

In general, the system is lightweight, making it portable, easy to manufacture, thus substantially reducing its cost to the end customer, and the entire system is water-proof for easy washing without any damage to the electrical circuits within it, mainly the battery and the pump.

In preferred embodiments of the invention, the machine also has an exhaust pipe so that the air sucked in by the closed chamber pump escapes outside:

a) the closed chamber; and, b) the interior of the machine where the pump, circuit, and battery are thus preventing the entry of water or steam that could damage them.

Thus, based on the figures, the machine assembly 1 then comprises said open chamber made up of a main water tank 2 that is configured to receive hot water. In particular, said tank 2 comprises a closed base 3 from which side walls 4 follow, which follow an elongated semi-cylindrical path in whose inner center protrudes parallel to the path of said walls 4 an elongated central cylindrical chamber 5 separated from said walls 4 of the main tank 2, forming a channel space 6 that is arranged between the central chamber 5 and the internal wall 4.

Additionally, said open chamber reservoir 2 comprises a coupling neck 7 that overhangs below the base 3 in the opposite direction to the projection of the walls 4. Said coupling neck 7 comprises a seal made up of a rubber ring 8 (o-ring) arranged to form a seal between the open chamber and the upper mouth 9 of a jar 10 arranged below and comprising the closed chamber according to the invention.

In this sense, so then the closed chamber is made up of jar 10 and is coupled to the open chamber by means of the coupling neck 7 of the main tank 2 adapted for coupling to the upper mouth 9 and providing a seal to the environment by seal ring 8 when the main tank 2 is arranged above said jug 10 covering its mouth 9. Thus, channel 6 is open in the direction of jug 10.

To create a vacuum inside jar 10 and thus form the closed chamber, said chamber 5 includes inside it a pump 11 that produces negative pressure operated by an interchangeable and/or rechargeable battery 12.

Figure 2:
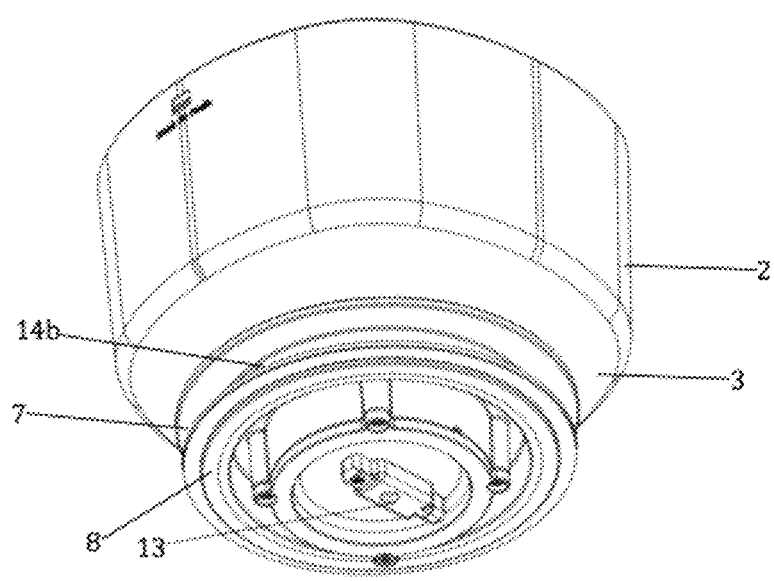
FIG. 2 illustrates the tank of the portable coffee machine assembly according to the invention.
Figure 3:
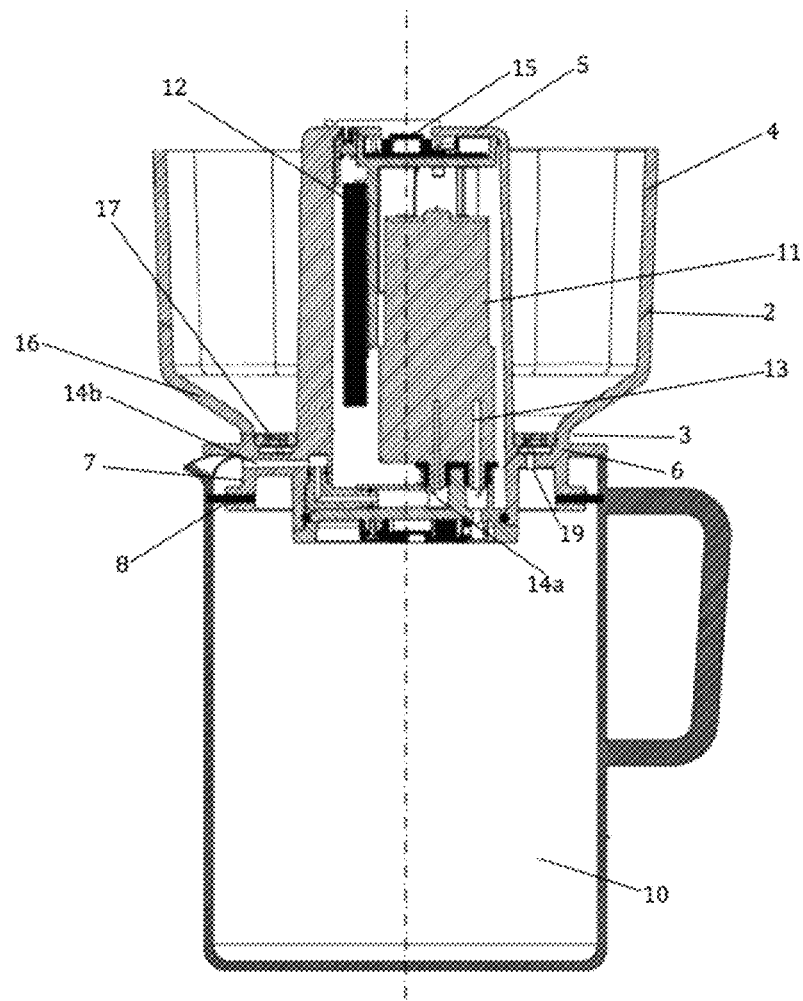
FIG. 3 illustrates in side section the negative pressure extraction portable coffee machine assembly according to the invention.

As illustrated in FIG. 2, said vacuum pump 11 comprises a suction port 13 that sucks air through pump 11 and transmits it to the atmosphere through the air exhaust outlet path 14a from pump 11 to outlet 14b above the rubber ring 8 and outside the inside of the jar 10.

In preferred embodiments of the invention, the enclosure 5 is sealed to the environment and may comprise an access cover to the interior to remove the replacement battery. Said battery, without being a limitation, may comprise lithium ion batteries or the like.

To operate the apparatus assembly 1, above the enclosure 5, there is a controller 15 close to the user for starting and stopping the pump 11.

On the other hand, inside the main tank 2, the walls converge towards the center of it, forming an outlet groove 16 towards the base 3, reducing the volume of the channel 6.

Said channel 6 receives removably above a filter ring 17 that includes flow windows 18 superimposed by a filter for the infusion extraction, covered by mesh filters for filtering the solid coffee. Said ring completely covers channel 6 and surrounds enclosure 5. Channel 6 is open towards jar 10 and the passage is covered by removable filter ring 17. Below the filter ring 17 the flow hole 19 is located in communication with the closed chamber of the jar 10. To avoid the plugging of the flow hole 19, the invention provides a space between the filter ring 17 and the flow hole 19.

Thus, the machine 1 consists of an open chamber with the main tank 2 and a closed chamber of the jar 10, connected by a flow hole 19 where a suction air pump 11 exerts a vacuum by negative pressure in the closed chamber of the jar 10 by means of a suction hole 13 and induces the liquid in the open chamber of the tank 2 to enter with pressure into the closed chamber of the jar 10 through said flow hole 19, while the filter ring 17 guarantees that the residue of the infusion remains in the open chamber of tank 2 and there is only passage to the prepared infusion to the closed chamber of jar 10.

The open chambers of the tank 2 and closed of the jar 10 are connected intercalated one inside the other where a seal 8 seals the closed chamber of the jar 10 and prevents the exit or entry of air from it.

The open chamber of the reservoir 2 and the closed chamber of the jar 10 can be separated and serve the infusion prepared from the jar 10.

During use, previously heated water between 80° and 100° C. is normally filled in the tank 2; then, a load of product to be infused in powder or in doses is introduced into tank 2; and the tank 2 is arranged into the jar 10 and closes the inside of said jar 10 by means of the seal 8. The hot water includes a filter capable of receiving a load of product to be infused. When the pump 11 starts, the air contained in the jug 10 is sucked creating a negative pressure and forcing the hot water infused with the product, towards the passage through the filter ring 17 through the flow hole 19 towards the jug 10, passing the filtered infusion to deliver the product obtained during an infusion cycle.

The infusion cycle thus then according to the assembly of the machine of the invention comprises a certain volume of water, that is brought to an infusion temperature, from said tank 2 to said jar 10 through an infusion flow filter.

Mainly, the shape of the tank 2 can be configured as a square with semicircular edges. This helps make it easier to deposit the water in the container since there are four ends where the circumference is greater and there is more space where the water can fall.

In preferred embodiments, the electric air suction pump removes air from a closed chamber and begins extraction.

The pump is operated by rechargeable batteries, although it can be a wall ac operated pump, including mechanical lever or crank.

Similarly, the filter ring 17 that retains the residue of material extracted in the main container, can be formed from metal mesh but can be plastic or cloth mesh. The filter ring 17 comprises a rubber frame that fits into the channel 16 of the tank 2 and superimposed on the flow hole 19. The filter ring 17 is installed adjacent and at a distance from the flow hole 19 that connects the two chambers to prevent ground coffee from plugging the hole and avoid extraction.

In alternative embodiments, flow port 19 can vary in quantity, size, shape, and direction. For example, if each flow hole has a direction of 70° in relation to the base plane of channel 6 of tank 2, where the coffee would press into the closed chamber at an angle generating a whirlpool. In other embodiments, the flow port 19 can be arranged at other angles between 60° and 90° relative to the base plane of channel 6 of tank 2.

In conclusion, the coffee machine according to the invention is self-sufficient without the need to be connected or anchored. It is light and easy to carry.

Only some preferred embodiments of the invention have been illustrated by way of example. In this regard, it will be appreciated that the construction of the negative pressure extraction portable coffee machine assembly, as well as the configurative arrangements that can be chosen from a plurality of alternatives without departing from the spirit of the invention according to the following claims be considered.

SUMMARY

A subject of the invention is a negative pressure extraction portable coffee machine assembly. More precisely but not exclusively, it discloses a negative pressure extraction portable coffee machine assembly that is related to coffee preparation machines that includes, without limitation, filtering, infusion and/or brewing of coffee or the like, filtered by negative pressure and by battery-based actuation. In particular, it refers to a machine consisting of two chambers: one open and one closed, connected by one or more flow holes superimposed by a filter where a suction air pump exerts a negative pressure vacuum in the closed chamber by means of of a suction port and induces liquid in the open chamber to enter the closed chamber under pressure through the flow ports, while the filter ensures that the infusion residue remains in the open chamber and there is only passage to the prepared infusion to the closed chamber. The negative pressure extraction portable coffee machine assembly is for the preparation of coffee, tea and in general beverages prepared by infusion.

What is claimed is:

1. A portable negative pressure infusion machine comprising:
    a bottom container (10) with a top opening (9) that is able to couple with a separate top container assembly (2);
    said top container assembly (2) comprising of an inner compartment (5) concentrically surrounded by a wall (4), wherein a channel space (6) forms between said compartment (5) and said wall (4);
    said top container assembly (2) further comprising of a flow hole (19) formed onto the surface of said channel space (6), wherein said flow hole (19) is directed towards the inside of said bottom container (10) when said top container assembly (2) is coupled to said bottom container (10);

said top container assembly (2) further comprising a coupling neck (7) and a seal (8), wherein said coupling neck (7) interfaces with said top opening (9) of said bottom container (10) to limit displacement of top container assembly (2) into said bottom container (10); and wherein said seal (8) of said top container assembly (2) forms a hermetic seal with said bottom container (10) when said top container assembly (2) is coupled with said bottom container (10);

said top container assembly (2) further comprising of an air pump (11) having an air flow inlet and an air flow outlet, a battery (12) to power said air pump (11), and a controller (15) connected to an user-accessible button (20) to switch said air pump (11) on or off, wherein said air pump (11), said battery (12), and said controller (15) are housed inside said compartment (5);

said top container assembly (2) further comprising of a suction hole (13) connected to the air flow inlet of said air pump (11) and an exhaust hole (14) connected to the air flow outlet of said air pump (11), wherein said suction hole (13) is directed towards the inside of said bottom container (10) and said exhaust hole (14) is directed towards the outside of said bottom container (10) when said top container assembly (2) is coupled to said bottom container (10); and a removable filter (17) whose shape coincides with channel space (6), wherein said filter (17) sits atop said flow hole (19) when installed into said channel space (6) of said top container (2).

2. The machine of claim 1 wherein said pump (11) is powered by electricity drawn from a power source (21) not contained in machine 1 and wherein battery (12) may or may not be present.

3. The machine of claim 1 wherein said compartment (5) is outside said wall (4) in said top container (2).

4. The machine of claim 1 wherein said compartment (5) is between said wall (4) in said top container (2).

5. The machine of claim 1 wherein said top container assembly (2) comprises of more than one compartment to house independently, or in any combination, said air pump (11), said battery (12), and said controller (15).

6. The machine of claim 5 wherein said compartments are between said wall (4) in said top container (2).

7. The machine of claim 5 wherein said compartments are outside of said wall (4) in said top container (2).

8. The machine of claim 1 wherein said wall (4) limits displacement of top container assembly (2) into said bottom container (10).

9. The machine of claim 1 wherein said controller (15) is switched on or off wirelessly from an external device capable of wireless interfacing with said controller (15) and wherein said button (20) may or may not be present.

10. The machine of claim 1 wherein said battery (12) is rechargeable.

11. The machine of claim 1 wherein said battery (12) is replaceable.

12. The machine of claim 1 wherein said channel space (6) comprises of more than one flow hole.

13. The machine of claim 1 wherein said removable filter (17) is entirely constructed with filtering material such as but not limited to cloth, metal mesh, paper, or another porous material.

14. The machine of claim 1 wherein said removable filter (17) has one or more windows covered with filtering material such as but not limited to cloth, metal mesh, paper, or another porous material.

15. Negative pressure extraction portable coffee machine assembly comprising:

an open chamber made up of a main tank (2) that includes a base (3), lateral walls (4) and a central enclosure (5) separated from said walls (4) of the main tank (2), forming a channel space (6) that is arranged between a said central enclosure (5) and said wall (4), wherein said tank (2) comprises a coupling neck (7) that protrudes below the base (3) in the opposite direction to the projection of its walls (4), where said coupling neck (7) comprises a seal (8), where said enclosure (5) includes within it a pump (11) that produces negative pressure operated by an battery (12) and where said channel (6) comprises a flow orifice (19); a closed chamber made up of a jar (10) that includes an upper mouth (9) and that receives the coupling neck (7) of said open chamber in coupling by means of said seal (8) covering its mouth (9); and a filter ring (17) that comprises a frame that fits into the channel (6) of the tank (2) and that includes flow windows (18) superimposed by a filter, where said filter ring (17) covers the flow orifice (19) arranged on the channel (6) of the main tank (2) and where said flow orifice (19) is opened in the direction of the jar (10) communicating the open chamber with the closed chamber.

\* \* \* \* \*